Oct. 20, 1964

W. H. GOETTL ETAL 3,153,332

AIR CONDITIONING UNIT

Filed May 29, 1961

INVENTOR.
EVERETT W. MOORE
BY & WILLIAM H. GOETTL

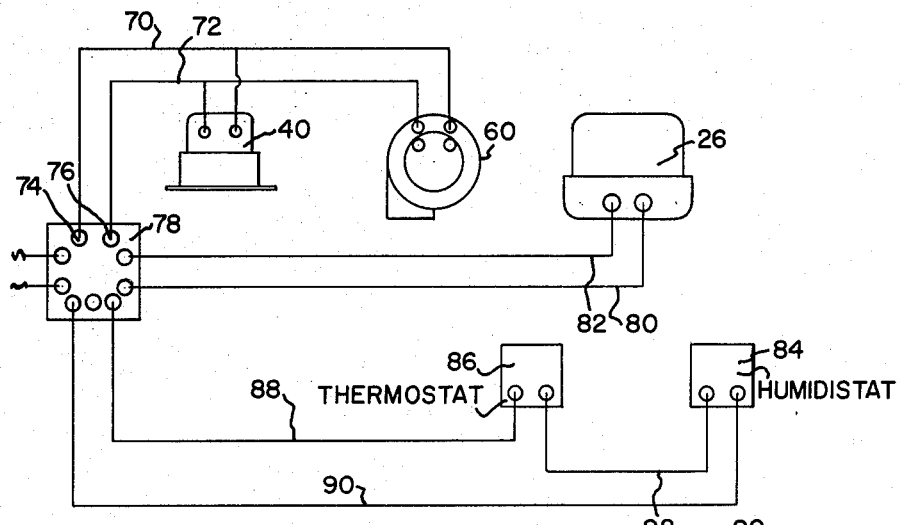
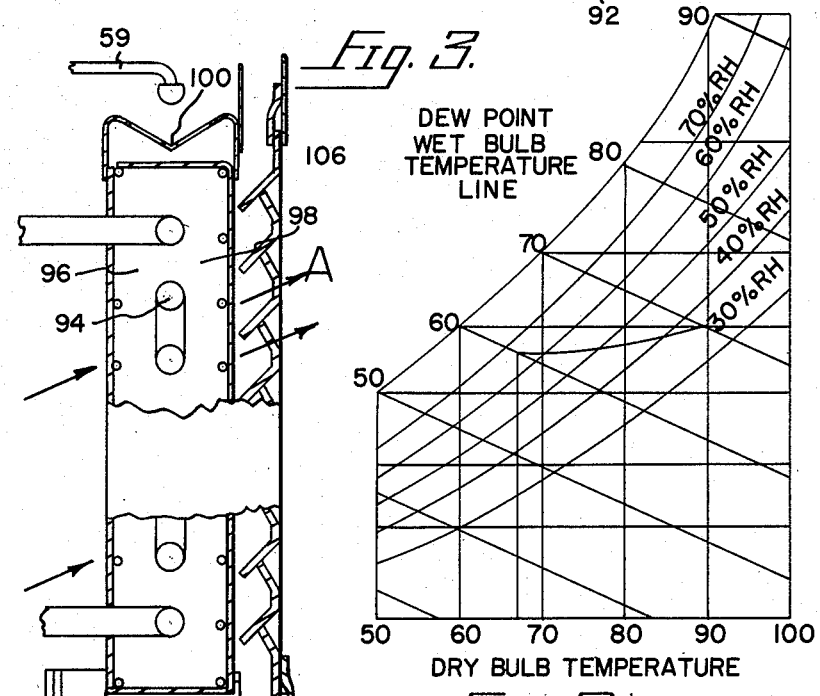
Fig. 3.
Fig. 4.
Fig. 5.
INVENTOR.
EVERETT W. MOORE
& WILLIAM H. GOETTL
BY

United States Patent Office 3,153,332
Patented Oct. 20, 1964

3,153,332
AIR CONDITIONING UNIT
William H. Goettl, 4627 N. Granite Reef Road, Scottsdale, Ariz., and Everett W. Moore, 3837 E. Glenrosa Ave., Phoenix, Ariz.
Filed May 29, 1961, Ser. No. 113,159
4 Claims. (Cl. 62—305)

This invention relates to an air conditioning unit and more particularly to an air conditioning unit comprising a combined evaporative cooler and water cooling means wherein the water cooling means chills water used in the pads of the evaporative cooler whereby humid air may be cooled without substantially increasing the humidity thereof.

In many areas evaporative cooling is effective throughout many months of the year during which time humidity is relatively low, however, evaporative cooling fails to produce desired cooling effects during hot weather and relatively high humidity. Under such conditions refrigeration has been found more desirable, however, evaporative cooling is relatively economical and refrigeration tends to cause undesirable drying of the air during periods when humidity is relatively low. In some air conditioning systems, independent evaporative cooling and refrigeration units are used to take advantage of the economy of the evaporative cooler and its tendency to moisten air during periods of relatively low humidity, whereupon the refrigeration may be used during periods of high temperature and relatively high humidity.

It has been found that the latter conditions in many areas prevail only during a month or two for each season, thus, the use of evaporative cooling with its attendant economy and humidity of air, delivered thereby, may be used to advantage most of the time and refrigeration may be used for short periods when evaporative cooling is not effective to a desired degree.

Such air conditioning systems employing both independent evaporative cooling and refrigeration systems are expensive to install and require a considerable amount of maintenance. Furthermore, the ducting and damper mechanisms required to alternately use evaporative cooling and refrigeration equipment may be prohibitive in many dwellings or other buildings.

Accordingly, it is an object of the invention to provide an air conditioning unit comprising combined features of an evaporative cooler and a refrigeration unit whereby, evaporative cooling may be used for a major portion of the time and whereby refrigeration may be used in combination with the evaporative cooling during short periods of time when relatively high humidity occurs.

Another object of the invention is to provide an air conditioning unit combining evaporative cooling and refrigeration means, whereby water utilized to wet evaporative cooling pads is chilled by a refrigeration system so that the chilled water in the evaporative cooler pad structure lowers the temperature thereof to the dew point of humid air passing therethrough which effectively cools the air and condenses moisture therefrom and collects such moisture in the evaporative cooler pad; thus, the air is cooled without appreciably increasing the humidity thereof.

Another object of the invention is to provide an air conditioning unit wherein an evaporative cooler is combined with a refrigeration system for cooling water applied to the upper portions of evaporative cooler pad means whereby said water is delivered to said pad means at a temperature below the dew point of humid air passing therethrough, thereby causing condensation of moisture from said humid air as it passes through the evaporative cooler pad.

Another object of the invention is to provide an air conditioning unit comprising an evaporative cooler having evaporative cooler pads wherein cold water is utilized to dehumidify air by maintaining said water below the required dew point temperature of the air passing therethrough.

Another object of the invention is to provide an air conditioning unit comprising evaporative cooler pad means disposed to receive water which is delivered thereto at a temperature considerably below the required dew point temperature of air passing through the pad; and whereby evaporative cooling in the pad tends to minimize the heating of the water as it passes downwardly through the pad so that the final temperature of the water as it reaches the lower portion of the pad will still be below the final dew point temperature of the air and thereby dehumidify air as it passes through the evaporative cooler pad during which time normal evaporative cooling takes place and the net result includes substantially sensible cooling as compared to the usual wet bulb cooling of an evaporative cooler.

Another object of the invention is to provide an air conditioning unit comprising combined features of an evaporative cooler and a refrigeration unit, whereby, the refrigeration unit is used to cool water applied to evaporative cooler pads of the unit, while the air from the blower of the evaporative cooler may be used to cool the condenser of the refrigeration equipment of the air conditioning unit.

Another object of the invention is to provide an air conditioning unit which greatly reduces the cost of air conditioning a home, or other areas, throughout the summer season.

Another object of the invention is to provide an air conditioning unit which properly humidifies and cools air during periods of low ambient humidity and which also operates efficiently to cool air during periods of high ambient temperature and and humidity.

Further objects and advantages of the invention may be apparent from the following specification, appended claims, and accompanying drawings, in which:

FIGURE 3 is a diagrammatic view of the electrical wiring in connection with various features of the air conditioning unit, in accordance with the invention;

Figure 1:
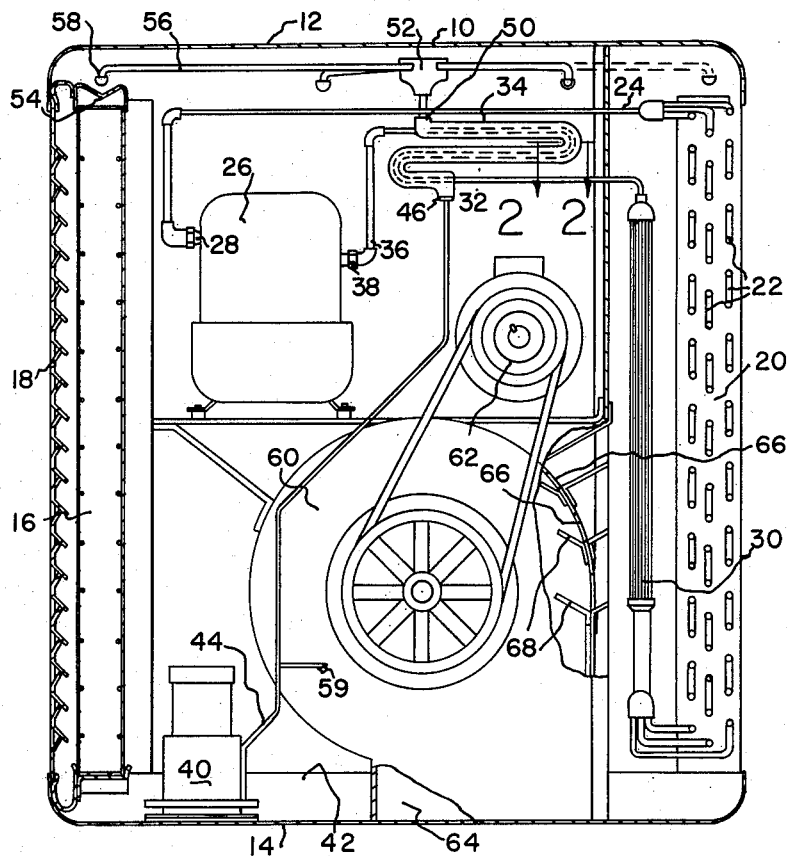
FIGURE 1 is a vertical sectional view of an air conditioning unit, in accordance with the invention, showing combined features of evaporative cooler and refrigeration systems.

FIGURE 4 is a fragmentary sectional view taken on substantially the same plane as that of FIGURE 1, and showing a modification of the invention wherein the refrigeration condenser is cooled by liquid contact in an evaporative cooler pad through which air is forced to circulate; and FIGURE 5 is a diagrammatic view illustrating relative effects of cooling, as compared to the relative humidity and the dew point at various temperatures and humidity conditions.

As shown in FIGURE 1 of the drawings, an air conditioning unit 10 of the invention comprises a cabinet top 12 and a sump pan bottom 14. Interconnecting the top 12 and bottom pad 14 are conventional evaporative cooler structural members not shown but which form frame work to support the top 12 on the sump pan 14.

In the side walls, of the unit, evaporative cooler pads 16 are disposed inwardly of louver plates 18, as will be hereinafter described.

In one side wall, of the unit, a refrigeration condenser 20 is disposed. This condenser 20 is composed of conventional finned refrigerant-conducting tubes 22 coupled to an outlet conduit 24, of a compressor 26. It will be understood, that the condenser tubes 22 carrying conventional refrigerant, such as Freon or its equivalent, and that the compressor 26, at its outlet 28, delivers gas through the conduit 24 to the condenser 22. The condenser 22 cools and condenses the gases to a liquid which travel, therefrom, through capillary tubes 30 to the inlet of an evaporator section 32, of the refrigeration system, of the air conditioning unit, in accordance with the invention.

This evaporator 32 is provided with a water jacket 34, through which water is conducted in liquid contact therewith, in order to cool the water, as will be hereinafter described. The evaporator 32 is provided with an outlet conduit 36, which conducts refrigerant gas to an inlet 38, of the compressor 26.

A water circulating pump 40, having its inlet communicating with water 42, in the sump 14, is disposed to deliver water through the jacket 34 to the evaporative cooler pads 16. The pump 40 is provided with an outlet conduit 44, which extends to an inlet 46 of the water jacket 34.

Figure 2:
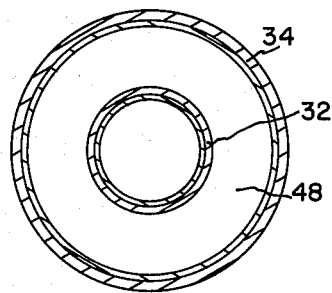
FIGURE 2 is an enlarged sectional view taken from line 2—2 of FIGURE 1.

As shown in FIGURE 2 of the drawings, the water jacket 34 is considerably larger in diameter than the evaporator 32 and provides a space 48 through which water may flow from the inlet 46 to an outlet portion 50 of the water jacket 34. Communicating with this outlet 50 is a distributor 52, forming a manifold for the delivery of the cooled water to a trough member 54 above each evaporative cooler pad 16. The distributor 52 is provided with conduit sections 56, having nozzles 58 disposed over the troughs 54, all as shown best in FIGURE 1 of the drawings.

A bleed-off conduit 59 communicates with the pump outlet conduit 44 to relieve a small amount of water therefrom, in order to permit a corresponding amount of fresh water to be admitted to the sump 14, by a conventional float valve (not shown).

A blower 60 is driven by a motor 62. The blower 60 is provided with a downwardly directed outlet duct 64 and auxiliary outlet openings 66. These auxiliary outlet openings 66 are in the side wall of the blower housing and are adjacent the refrigeration condenser 20.

Louvers 68 are connected to the side wall of the blower housing and are directed inwardly at an angle toward the wheel of the blower in order to pick up air for delivery through the openings 66, toward the condenser 20. These openings 66 and the respective louvers 68 deliver a minor percentage of the air moved by the blower 60, to the condenser 20 for cooling the same.

As shown in FIGURE 3 of the drawings, motors of the blower 60 and water pump 40 are coupled to electrical conduits 70 and 72, connected to terminals 74 and 76 of the conventional terminal box 78. The motor of the compressor 26 is coupled to the terminal box 78 by means of conductors 80 and 82.

A humidistat 84 and a thermostat 86 are also electrically coupled to the terminal box 78, by means of conductors 88, 90, and 92.

Operation of the air conditioning unit, in accordance with the present invention, is substantially as follows:

During weather when the relative humidity is low and the ambient temperature is high, the blower 60 operates as a conventional evaporative cooler blower for forcing air inwardly through the louver plates 18 and evaporative cooler pads 16 to the inlet of the blower and downwardly through the outlet 64, whereby, the air is evaporatively cooled and delivered to a use location. During the operation of the air conditioning unit as an evaporative cooler, the pump 40 delivers water through its outlet conduit 44 and to the distributor 52, which manifolds the water to the conduits 56 and nozzles 58, whereby the water is deposited in the troughs 54 and permitted to gravitate downwardly through the pads 16 while air passes therethrough and evaporation takes place to lower the temperature of the air.

During the relatively low humidity conditions of the ambient atmosphere, sufficient cooling is accomplished and the addition of humidity to the air by the evaporative cooling process is not objectionable. In many instances, the addition of moisture to the air by the evaporative cooling process, is advantageous as compared to the relative extraction of moisture from the air by conventional refrigeration cooling. This advantage of evaporative cooling is particularly apparent during weather in which the relative humidity is very low, since refrigeration cooling under these conditions reduces the humidity of the air to such an extent that it is sometimes unhealthful and very drying.

The air conditioning unit of the invention, operates both as an evaporative cooler and as a combined evaporative cooler and refrigeration cooler, whereby, the combined functions more nearly approximate sensible cooling, as will be hereinafter described.

When ambient temperature is high and the relative humidity of the ambient atmosphere increases to such an extent that evaporative cooling becomes inefficient, the humidistat 84 through the terminal box 78 energizes the refrigeration compressor 26 which compresses refrigerant gas into the condenser 20, which is cooled by air passing through the openings 66 from the blower housing 60. This causes condensation of the refrigerant, which then passes through the capillary tubes 30 to the evaporator 32 internally of the water jacket 34, wherein evaporative cooler water is being circulated.

The water passes from the pump 40 through its outlet conduit 44, and into the water jacket 34, in surrounding relation with the evaporator 32. Thus, the water is cooled before it reaches the distributor 52, from which it passes through tubes 56 and nozzles 58 into troughs 54 at the upper portions of the evaporative cooler pads 16. The water, which has been cooled by the refrigerant evaporator 32, is at relatively low temperature and thus, reduces the temperature of the upper portion, of the evaporative cooler pads 16, to a degree considerably below atmospheric and provides a dew point condition which causes extraction of humidity from the air passing through the evaporative cooler pads. Also, the low temperature of the water, as well as some evaporation thereof, causes very efficient cooling of the air as it passes through the pads 16. Thus, a substantial reduction of humidity, of the ambient atmosphere, is caused as it passes through the upper portions of the pads 16, while the temperature gradient increases as the water passes downwardly through the pads 16 toward the lower portions thereof. However, the overall cooling effect of the air is due to a combined function of the latent heat of vaporization and conductive cooling afforded by contact of the air with the cold water, as it passes downwardly through the pad from the refrigerant evaporator. Thus, the air is cooled without substantially increasing the humidity thereof, when considering the overall flow of air throughout the entire area of each evaporative cooler pad.

It will be apparent to those skilled in the art, that the water delivered to the evaporative cooler pads 16 via the trough 54 may be at a temperature considerably below the required dew point temperature of air passing through the pads. Accordingly, as humid air passes through the pads, saturated with such cold water, the pads will cause dehumidification of the air and at the same time cool this air as it passes through the pads. Additionally, a certain degree of evaporative cooling will take place, which tends to minimize the heating effect on water passing downwardly through the pads. It will be appreciated by those skilled in the art that as the water passes downwardly through the pads 16 from the upper portions to the lower portions thereof, that the temperature of the water and the flow thereof may be maintained so that the water at the lower portions of the pads must always be maintained below the required dew point temperature of the air passing through the pads. Such an amount of cold water must be used that, as the water heats up from its initial temperature at the upper portions of the pads that its final temperature at the lower portions of the pads will still be below the dew point temperature of the air passing through the pads.

It will be appreciated by those skilled in the art, that the refrigeration capacity of the compressor 26, condenser 20, and evaporator 32 may be varied as desired in proportion to the flow capacity of the blower 60 and the relative area of the evaporative cooler pads 16. Accordingly, the amount of cold water and its relative temperature may be varied for the purpose of delivering cool water to the evaporative cooler pads 16 to effect a sufficient amount of cooling by refrigeration so that the combined refrigeration and evaporative cooling function may be effective during weather in which high temperature and high relative humidity exist.

With reference to FIGURE 5 of the drawings, the functions of evaporative cooling, refrigeration cooling, and sensible cooling are graphically disclosed with relation to a dew point line, temperature, and relative humidity. This diagrammatic illustration is similar to a conventional psychometric chart and serves, generally, to illustrate functional capabilities of the invention. It will be seen that the evaporative cooling process substantially increases humidity of air, while refrigeration cooling substantially decreases humidity of the air, and that sensible cooling merely changes temperature without any substantial change in the humidity of the air. An example of the foregoing operation might be represented by conditions as follows: air entering the pads 16 might be at a dry bulb temperature of 90 degrees F., a wet bulb temperature of 70 degrees F., at a relative humidity of 35 percent corresponding to a dew point of 60 degrees F. The water temperature at the upper portion of each pad 16 might be 50 degrees F. and might be 57 degrees F. at the lower portion of the pad. Under such conditions, air would be cooled to a dry bulb temperature of 67 degrees F., a wet bulb temperature of 60 degrees F. at a relative humidity of 67 percent and a dew point of 57 degrees F. Accordingly, it will be seen that the water passing downwardly through the pads 16 might rise slightly in temperature but its final temperature would still be below the desired dew point temperature of the air passing through the pad.

The foregoing conditions would be compatible with an efficient evaporative cooler wherein air velocity passing through the pads would be approximately 1500 feet per minute.

It will be obvious that the temperature of the water passing downwardly through the pad may be reduced or a relatively greater flow of water may be provided at a given temperature, or the air flow through the pads 16 may be reduced, to maintain the desired dew point temperature throughout the area of the pad relative to the air passing therethrough.

It will be appreciated, from the foregoing examples, that while the cooled air may contain substantially the same weight of water, that its humidity is relatively higher than the air entering the pad structure, due to the evaporative cooling function which assists, progressively, to maintain a low temperature of the water as it passes downwardly through the evaporative cooler pads. While the ambient air might tend to heat the cool water, evaporative cooling which takes place, tends to maintain the water at a low temperature and for this reason only a slight temperature rise from 50 degrees F. at the top of the pad to 57 degrees F. at the bottom of the pad takes place in accordance with the foregoing example.

As hereinbefore described, the air conditioning unit of the invention may be proportioned and sized so that air may be cooled sensibly without substantial change in humidity. However, the use of the refrigeration system, hereinbefore described, in combination with the evaporative cooler system may be employed only when the humidistat 84 responds to an increase in humidity. The humidistat 84 being in series with the thermostat 86, does not initiate operation of the compressor 26 under conditions wherein ambient temperatures are low and relative humidity is high. Further, the refrigerant compressor 60 is not energized when, for example, the ambient temperature is high, which only causes closing of the thermostat, and during times of low humidity, which causes the switch of the humidistat to hold the compressor energizing circuit open.

As shown in FIGURE 4 of the drawings, the modification of the invention comprises a tubular condenser 94 disposed between evaporative cooler pad layers 96 and 98, which receive water from a trough 100, the bleed-off conduit 59 communicating with the pump outlet conduit 44.

It will be understood that the condenser 94 is equivalent to the condenser 20, hereinbefore described, but is a more efficient liquid contact device having greater capacity than a conventional finned condenser. In operation, the modified form of the invention functions to condense refrigerant gas to liquid for conduction to the evaporator 32, in a similar manner, as hereinbefore described. Cooling of the condenser 94 is accomplished by air passing through the evaporative cooler pad sections 96 and 98 surrounding the condenser 94 while water gravitates downwardly, therethrough, from the trough 100.

Below the evaporative cooler pad sections 96 and 98, is a separate small sump 102, having a drain 104, whereby water heated by the condenser 94, is drained away separately from the water 42, contained in the sump 14.

Air, which passes through the pad sections 96 and 98 around the condenser 94, travels in the direction of arrows A in FIGURE 4 of the drawings, through a conventional louver plate 106, similar to the hereinbefore described louver plates 18, outwardly of the evaporative cooler pads 16. The air passing through the evaporative cooler pad sections 96 and 98 is supplied through openings 66 in the side wall of the blower housing as disclosed in FIGURE 1 of the drawings.

It will be obvious to those skilled in the art that various modifications of the present invention may be resorted to in a manner limited only by a just interpretation of the following claims.

We claim:

1. In an air conditioning unit, the combination of: an evaporative cooler pad means; second means for forcing air therethrough; third means for delivering water to said evaporative cooler pad means; and refrigeration means for cooling said water delivered by said third means; a condenser of said refrigeration means; and fourth means for diverting a portion of the air delivered by said second means to cool said condenser means; evaporative cooler pad means contiguous with said condenser means; and means for delivering water to said last mentioned evaporative cooler pad means.

2. In an air conditioning unit, the combination of: an evaporative cooler pad means; second means for forcing air therethrough, third means for delivering water to said evaporative cooler pad means; and refrigeration means for cooling said water delivered by said third means; a condenser of said refrigeration means; and fourth means for diverting a portion of the air delivered by said second means to cool said condenser means; evaporative cooler pad means contiguous with said condenser means; and means for delivering water to said last mentioned evaporative cooler pad means; an individual means below said last mentioned evaporative cooler pad means for draining the water heated by said condenser away from said air conditioning unit.

3. In an air conditioning unit, the combination of: a housing; walls of said housing having evaporative cooler pads therein; a blower internally of said housing disposed to force air through said evaporative cooler pads; a conduit disposed to deliver water to said evaporative cooler pads; a refrigerant evaporator in heat exchange relationship with said conduit for cooling said water; a water distributor for delivering water from said evaporator to said evaporative cooler pads; a refrigerant compressor communicating with said evaporator and disposed to receive refrigerant gas therefrom; an outlet for said refrigerant compressor; a condenser communicating with said outlet of said compressor; an outlet of said condenser communicating with the inlet of said evaporator; and means for diverting a portion of the air delivered by said blower to cool said condenser; sump means in the lower portion of said housing; and a pump disposed therein and coupled to said first mentioned conduit for delivering water thereto in heat exchange relation to said evaporator; and second evaporative cooler pad means in contiguous relationship with said condenser; and means for delivering water to said last mentioned evaporative cooler pad means.

4. In an air conditioning unit, the combination of: a housing; walls of said housing having evaporative cooler pads therein; a blower internally of said housing disposed to force air through said evaporative cooler pads; a conduit disposed to deliver water to said evaporative cooler pads; a refrigerant evaporator in heat exchange relationship with said conduit for cooling said water; a water distributor for delivering water from said evaporator to said evaporative cooler pads; a refrigerant compressor communicating with said evaporator and disposed to receive refrigerant gas therefrom; an outlet for said refrigerant compressor; a condenser communicating with said outlet of said compressor; an outlet of said condenser communicating with the inlet of said evaporator; and means for diverting a portion of the air delivered by said blower to cool said condenser; sump means in the lower portion of said housing; and a pump disposed therein and coupled to said first mentioned conduit for delivering water thereto in heat exchange relation to said evaporator; and second evaporative cooler pad means in contiguous relationship with said condenser; and means for delivering water to said last mentioned evaporative cooler pad means; said condenser disposed in one side wall of said housing; and a drain sump disposed below said condenser to drain water heated by said condenser away from said air conditioning unit.

References Cited in the file of this patent
UNITED STATES PATENTS

| | | |
|---|---|---|
| 2,165,979 | Nicholson | July 11, 1939 |
| 2,185,198 | Huggins | Jan. 2, 1940 |
| 2,541,921 | Henney | Feb. 13, 1951 |